US008873381B2

(12) United States Patent
Song et al.

(10) Patent No.: US 8,873,381 B2
(45) Date of Patent: Oct. 28, 2014

(54) BEARER QUALITY OF SERVICE SELECTION

(75) Inventors: Osok Song, San Diego, CA (US); Ramachandran Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 12/818,071

(22) Filed: Jun. 17, 2010

(65) Prior Publication Data

US 2010/0322069 A1 Dec. 23, 2010

Related U.S. Application Data

(60) Provisional application No. 61/219,309, filed on Jun. 22, 2009.

(51) Int. Cl.
*H04L 12/24* (2006.01)
*H04W 28/24* (2009.01)

(52) U.S. Cl.
CPC ..................................... *H04W 28/24* (2013.01)
USPC ........... 370/229; 370/329; 370/230; 370/231; 370/235; 709/223; 709/228; 709/240

(58) Field of Classification Search
CPC .............. H04L 12/24; H04L 41/0893; H04W 29/0268; H04W 28/24; H04W 4/005; H04W 24/02; H04W 84/045
USPC ......... 370/229, 331, 341, 468, 252, 401, 412, 370/233, 315, 329, 230, 328, 235; 709/223, 709/228, 240; 398/158, 28

See application file for complete search history.

(56) References Cited

U.S. PATENT DOCUMENTS

| 6,690,679 | B1 | 2/2004 | Turunen et al. |
| 2004/0057412 | A1* | 3/2004 | Curcio et al. ................. 370/341 |
| 2009/0097402 | A1 | 4/2009 | Stumpert et al. |
| 2010/0265823 | A1* | 10/2010 | Zhao et al. .................... 370/233 |

FOREIGN PATENT DOCUMENTS

| CN | 101277174 A | 10/2008 |
| EP | 1976196 A1 | 10/2008 |
| JP | 2012524463 A | 10/2012 |

(Continued)

OTHER PUBLICATIONS

3rd Generation Partnership Project; Technical Specification Group Core Network and Terminals; Non-Access-Stratum (NAS) protocol for Evolved Packet System (EPS); Stage 3 (Release 8); &S 24.301 V8.2.0; Jun. 8, 2009.*

(Continued)

*Primary Examiner* — Jamal Javaid
(74) *Attorney, Agent, or Firm* — François A. Pelaez

(57) ABSTRACT

In the event an entity receives a message including an unknown quality of service parameter (e.g., class identifier) for a bearer, the entity may select a quality of service parameter for the bearer from a set of known quality of service parameters. Here, a guaranteed bit rate quality of service parameter may be selected from the set upon determining that the unknown quality of service parameter is associated with a guaranteed bit rate bearer. Conversely, a non-guaranteed bit rate quality of service parameter may be selected from the set upon determining that the unknown quality of service parameter is not associated with a guaranteed bit rate bearer.

28 Claims, 10 Drawing Sheets

(56) References Cited

FOREIGN PATENT DOCUMENTS

| RU | 2337505 C2 | 10/2008 |
|---|---|---|
| WO | WO-2005002264 A1 | 1/2005 |
| WO | WO-2008145012 A1 | 12/2008 |
| WO | WO-2008157423 A2 | 12/2008 |

OTHER PUBLICATIONS

3GPP TSG CT WGI Meeting #58, C1-091601, Sophia Antippiis (France), Apr. 20-24, 2009.

International Search Report and Written Opinion—PCT/US2010/039551—ISA/EPO—Nov. 25, 2010.

"3rd Generation Partnership Project; Technical Specification Group Services and System Aspects; Policy and charging control architecture (Release 8)", 3GPP Standard; 3GPP TS 23.203, 3rd Generation Partnership Project (3GPP), Mobile Competence Centre ; 650, Route Des Lucioles ; F-06921 Sophia-Antipolis Cedex ; France, No. V8.6.0, Jun. 8, 2009, pp. 1-113, XP050363028.

Taiwan Search Report—TW099120275—TIPO May 30, 2013.

3GPP TS 24.301, "Discussion on the handling of unknown QCI", Huawei, C1-092555, 3GPP TSG CT WG1 Meeting #59, Los Angeles (USA). Jun. 22-26, 2009, 2 pages.

3rd Generation Partnership Project; Technical Specification Group Core Network and Terminals; Non-Access-Stratum (NAS) protocol for Evolved Packet System (EPS); Stage 3 3GPP Standard; 3GPP TS 24.301, 3rd Generation Partnership Project (3GPP), Mobile Competence Centre; 650, Route Des Lucioles; F-06921 Sophia-Antipolis Cedex; France, No. V8.2.1, Jun. 8, 2009, pp. 124, 160-175, 212-215.

Ekstrom H: "QoS control in the 3GPP evolved packet system", IEEE Communications Magazine, vol. 47, No. 2, Feb. 1, 2009, pp. 76-83, XP011280742, ISSN: 0163-6804, DOI:10.1109/MCOM.2009.4785383.

\* cited by examiner

BEARER QUALITY OF SERVICE SELECTION

CLAIM OF PRIORITY

This application claims the benefit of and priority to commonly owned U.S. Provisional Patent Application No. 61/219,309, filed Jun. 22, 2009, the disclosure of which is hereby incorporated by reference herein.

BACKGROUND

1. Field

This application relates generally to communication and more specifically, but not exclusively, to specifying quality of service parameters for bearers.

2. Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

In a typical implementation, one or more bearers are established between an access terminal and the network to facilitate communication between the access terminal and the network. In some aspects, such a bearer may specify the quality of service (QoS) to be supported between the access terminal and the network for this communication (e.g., for a particular connection). For example, a bearer may specify QoS parameters such as latency, maximum bit rate (MBR), guaranteed bit rate (GBR), error rate, and priority. Thus, the access terminal and the network may each determine how traffic flow for communication between these entities is to be handled based on the QoS parameters defined for the bearer.

In practice, communication standards employed by networks are continually evolving and each new version of a communication standard may support different functionality than prior versions. For example, a newer version of a communication standard may support additional QoS parameters that were not supported in a prior version of the communication standard. Hence, it is possible that an access terminal and a network at which the access terminal attempts to establish a connection may support different versions of a communication standard. For example, an older access terminal may attempt to communicate with a newer network entity, or a newer access terminal may attempt to communicate with an older network entity. In such a case, one of these entities may employ bearer QoS parameters that are not known by the other entity. Consequently, the attempt to establish communication may fail. Thus, there is a need for more effective techniques for specifying QoS parameters for bearers.

SUMMARY

A summary of sample aspects of the disclosure follows. In the discussion herein, a reference to the term aspects may refer to one or more aspects of the disclosure.

The disclosure relates in some aspects to selecting a QOS parameter for a bearer. For example, when an entity receives a message that specifies an unknown QOS parameter for a bearer, the entity may select a QOS parameter for that bearer from a set of QOS parameters known by the entity. As a specific example, in an implementation that employs QOS class identifiers (QCIs), when an entity receives an unknown QCI for a bearer, that entity may select a QCI for that bearer from a set of QCIs known by that entity.

The disclosure relates in some aspects to selecting a QOS parameter for a bearer based on whether a received unknown QOS parameter corresponds to a guaranteed bit rate (GBR) bearer. For example, an entity may select a known GBR QCI for a bearer upon receipt of an unknown QCI that corresponds to a GBR bearer. Conversely, the entity may select a known non-GBR QCI for the bearer upon receipt of an unknown QCI that does not correspond to a GBR bearer. Here, a determination of whether the unknown QCI corresponds to a GBR bearer may be based on, for example, the value of the QCI or a determination of whether bit rate information (e.g., GBR information) was sent with the unknown QCI.

BRIEF DESCRIPTION OF THE DRAWINGS

These and other sample aspects of the disclosure will be described in the detailed description and the appended claims that follow, and in the accompanying drawings, wherein:

Figure 1:
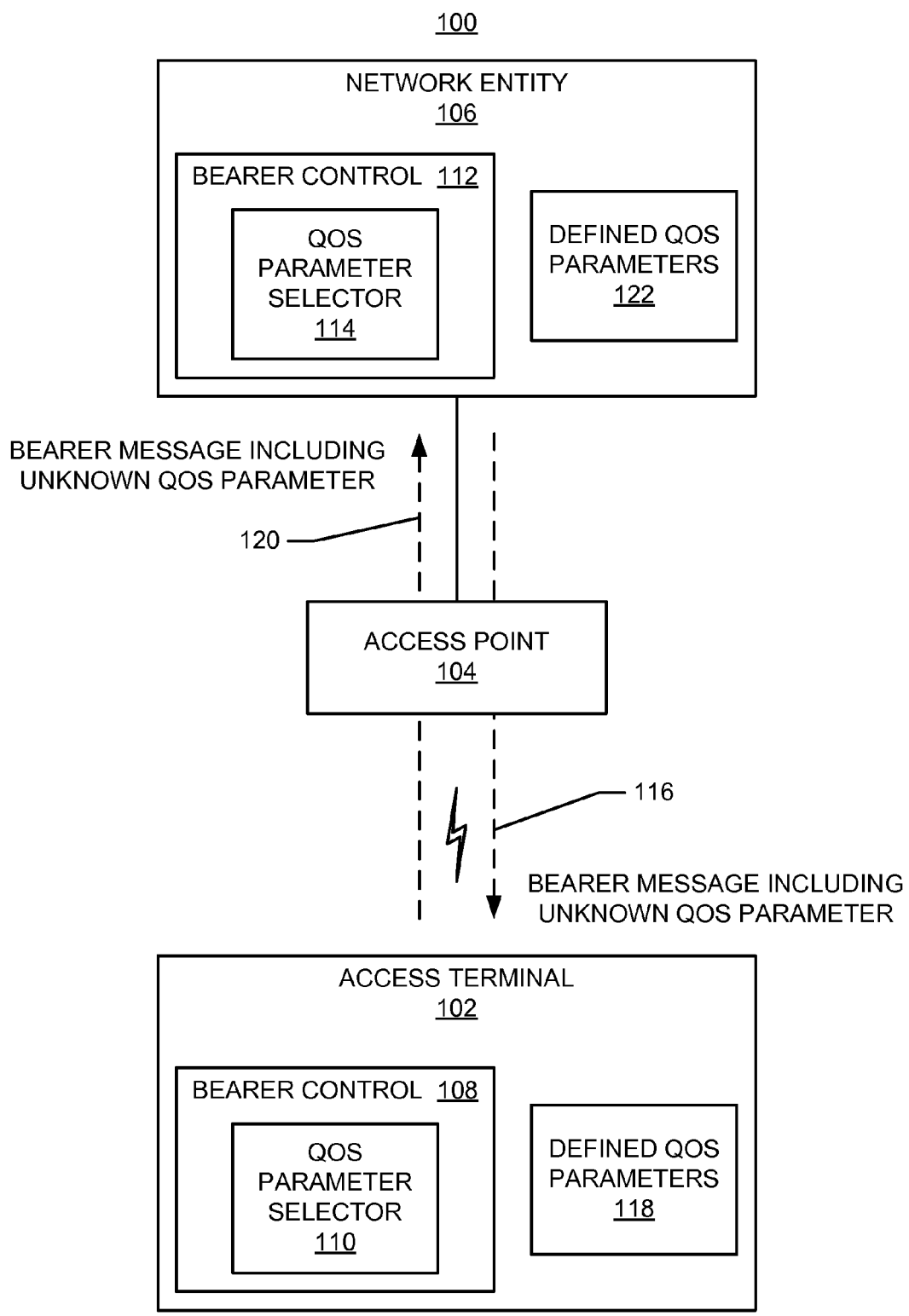
FIG. 1 is a simplified block diagram of several sample aspects of a communication system adapted to select a QoS parameter from a set of known QoS parameters in the event an unknown QoS parameter is received.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations or eNodeBs, access terminals may be referred to or implemented as user equipment or mobiles, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104 or some access point in the system 100 (not shown). Each of these access points may communicate with one or more network entities (represented, for convenience, by network entity 106) to facilitate wide area network connectivity.

These network entities may take various forms such as, for example, one or more radio and/or core network entities. Thus, in various implementations the network entity may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for the access terminals; and providing access control for access terminals. Also, two or more of these network entities may be co-located or the components of any of the network entities may be distributed within the network.

When communication is initiated between an access terminal and a network, the network may establish one or more bearers to support communication between these entities. In some aspects, a bearer defines a logical pipe that specifies how a flow of traffic to and/or from an access terminal is to be handled by the network and the access terminal. For example, a bearer may specify the QoS to be applied to the traffic. Consequently, in conjunction with the establishment of a bearer, the access terminal and the network each maintain corresponding bearer context. This bearer context may include a bearer identifier, QoS information, and at least one packet filter assigned for the traffic flow. Thus, when a bearer is established or modified, the access terminal and the network exchange bearer context information so that each entity will know how to treat the corresponding traffic flow.

The establishment of a bearer may be initiated by the access terminal or the network. For example, when an application (e.g., at another access terminal, a server, etc.) needs to communicate with an access terminal via the network, the network may send a bearer set-up message to the network. This bearer message may include QoS parameters that the network has selected for the communication.

Conversely, when an application on an access terminal needs to communicate with the network, the access terminal may send a bearer request message to the network. This bearer request message may include QoS parameters that the access terminal has selected for the communication. In response to this message, the network may send a message to the access terminal to set-up a bearer. This message also may include QoS parameters (e.g., as requested by the access terminal or as selected by the network for the communication).

In the example of FIG. 1, the access terminal 102 includes a bearer control component 108 for performing operations relating to establishing bearers and maintaining information related to all bearers that are set up between the access terminal 102 and the network. For example, in some cases the bearer control component 108 may initially select bearer parameters that are deemed to be sufficient for a given bearer (e.g., a QoS parameter selector 110 may select an appropriate QCI for a bearer).

The network also includes bearer control components for establishing bearers and maintaining information that relates to all bearers that are set up between the network and access terminals that communicate with the network. In practice, the network includes several network entities that provide this functionality to support connectivity for a large number of access terminals over a large geographical area. For purposes of illustration, the discussion that follows will focus on sample operations of one such network entity as represented by network entity 106. The network entity 106 includes a bearer control component 112 that selects appropriate bearer parameters to be used for a given bearer (e.g., a QoS parameter selector 114 may select an appropriate QCI for a bearer) in some cases.

In accordance with the teachings herein, an access terminal and/or the network may include functionality to select an appropriate QoS parameter in the event an unknown QoS parameter is received. For purposes of illustration, both the access terminal 102 and the network entity 106 are shown in FIG. 1 as including such functionality. For example, in the event the access terminal 102 receives a bearer-related message 116 that includes a QoS parameter (e.g., QCI) that is not known by the access terminal 102, the QoS parameter selector 110 may select a QoS parameter for the corresponding bearer from a set of defined QoS parameters 118 known by the access terminal 102. Similarly, in the event the network entity 106 receives a bearer-related message 120 that includes a QoS parameter (e.g., QCI) that is not known by the network entity 106, the QoS parameter selector 114 may select a QoS parameter for the corresponding bearer from a set of defined QoS parameters 122 known by the network entity 106.

Sample operations that may be performed by an entity (e.g., an access terminal or a network entity) in conjunction with selecting a QoS parameter in accordance with the teachings herein will now be described in more detail with reference to the flowchart of FIG. 2. For convenience, the operations of FIG. 2 (or any other operations discussed or taught herein) may be described as being performed by specific components (e.g., the components of FIGS. 1, 7, and 8). It should be appreciated, however, that these operations may be performed by other types of components and may be performed using a different number of components. It also should be appreciated that one or more of the operations described herein may not be employed in a given implementation.

Figure 2:
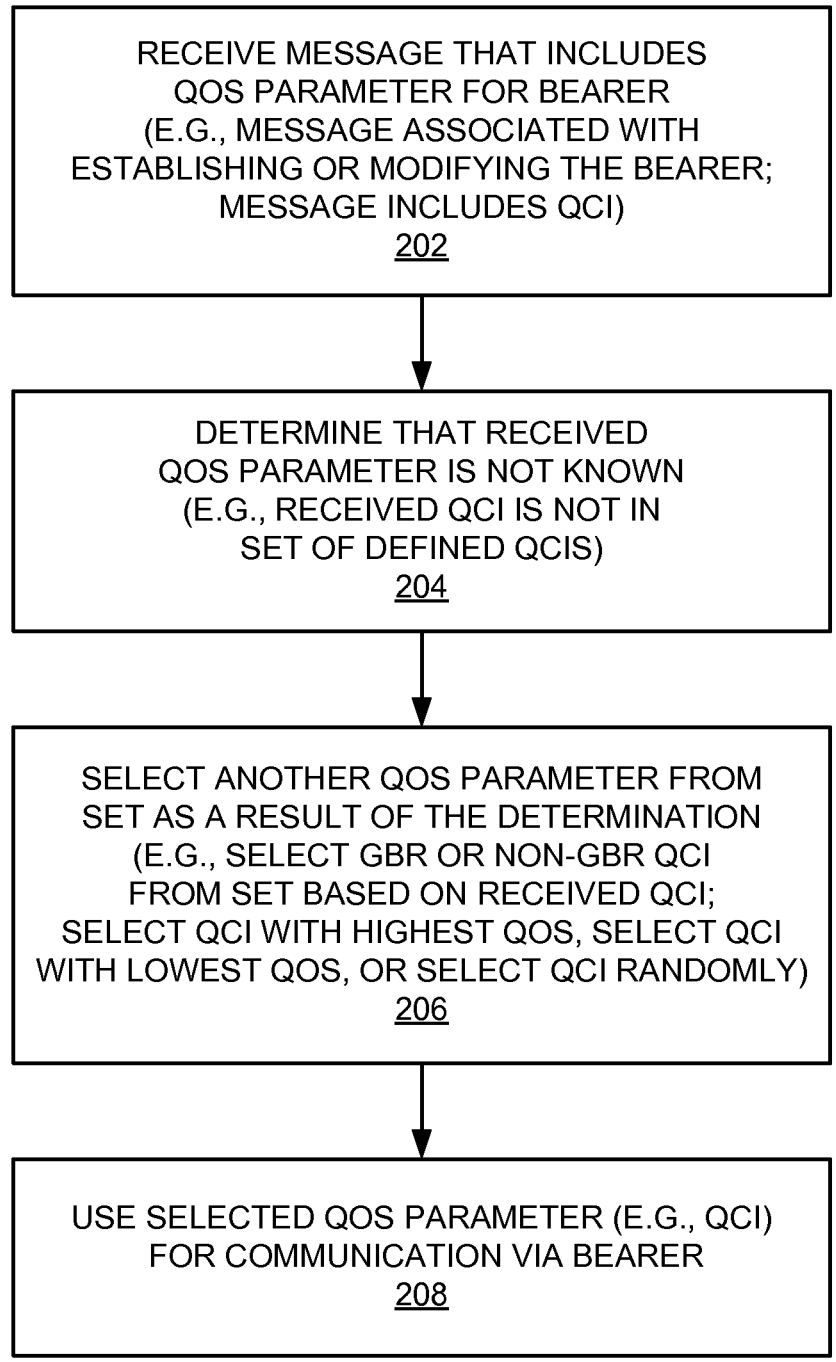
FIG. 2 is a flowchart of several sample aspects of operations that may be performed to select a QoS parameter from a set of known QoS parameters in the event an unknown QoS parameter is received.

As represented by block 202 of FIG. 2, at some point in time, an entity (hereafter referred to as the receiving entity) receives a message from another entity (hereafter referred to as the other entity) where the message includes a QoS parameter for a bearer. For example, the message may be associated with establishing a bearer or modifying an existing bearer. In addition, the included QoS parameter may include an indication of QoS that the other entity has selected for the bearer. As discussed in more detail below, such a message may comprise a bearer request message, a bearer set-up message, or some other type of message.

In some aspects, the QoS parameter may specify how traffic flow between the entities is to be handled. For example, the QoS parameter may specify at least one of: a desired or acceptable level of information loss (e.g., maximum packet loss), a desired or acceptable delay (e.g., maximum packet delay), a desired or required data rate, priority, or some other quality-related characteristic. In LTE-based networks, the QoS information may comprise a QCI. Here, different QCIs values may be assigned for different types of traffic flows. Each of these different QCI values may then be associated with, for example, different values for one or more of: a guaranteed bit rate for an IP packet flow, a maximum bit rate (e.g., an aggregate maximum bit rate) for an IP packet flow, the type of delay or packet loss expected for an IP packet flow, or the type of priority given for an IP packet flow.

As represented by block 204 of FIG. 2, in some cases, the receiving entity will determine that the received QoS parameter is unknown. For example, the receiving entity may determine that the received QoS parameter is not a member of a defined set of QoS parameters that the receiving entity is configured to support. As discussed herein, this situation may arise, for example, in a case where the entities support different versions of a communication standard, where the different versions specify different QoS parameters.

As represented by block 206, as a result of the determination of block 204, the receiving entity selects a QoS parameter for the bearer from the set of defined QoS parameters. That is, rather than reject the message due to an unknown parameter, the receiving entity identifies another QoS parameter that the receiving entity will use for communication associated with the bearer. In some cases, the receiving entity may identify this QoS parameter without informing the other entity (e.g., to avoid associated communication overhead in the network). Thus, the receiving entity may use one QoS parameter for handling traffic flow for a given bearer, while the other entity may use another QoS parameter for handling traffic flow for that bearer.

The receiving entity may select its QoS parameter in a manner that improves the likelihood that the selected QoS parameter is similar to the QoS parameter used by the other entity. In this way, the traffic flow may be handled similarly (or substantially similarly) by the two entities to mitigate any adverse effects that the use of potentially different QoS parameters may have on that traffic flow.

In some implementations, the receiving entity selects a QoS parameter that has bit rate characteristics that are similar to the bit rate characteristics of the QoS parameter used by the other entity. For example, if the received QoS parameter is associated with a particular type of bit rate parameter (e.g., guaranteed bit rate and/or maximum bit rate), the receiving entity may select a QoS parameter from the set that is associated with a similar type of bit rate parameter. Conversely, if the received QoS parameter is not associated with a bit rate parameter, the receiving entity may select a QoS parameter from the set that is not associated with a bit rate parameter.

In some implementations, the receiving entity selects the QoS parameter that specifies the highest QoS in the set. This approach may be based, for example, on an assumption that the reason the received QoS parameter is unknown is because this parameter is a newer parameter (e.g., defined by a newer version of the communication standard). This approach also may be based, for example, on an assumption that this parameter was defined because newer networks are able to handle higher QoS demands. Consequently, if these assumptions are true, the best QoS available for use by the receiving entity may most closely match the QoS being used by the other entity.

In some implementations, the receiving entity may select a QoS parameter in a manner that mitigates the impact that the selected QoS parameter may have on the performance at the receiving entity. For example, the receiving entity may select the QoS parameter that specifies the lowest QoS in the set. In this case, the receiving entity may be ensured that it is not allocating excessive QoS to this traffic flow. This scheme may be employed, for example, when resources are in high demand at the receiving entity.

In some implementations, the receiving entity may simply randomly select a QoS parameter. In such a case, a fair allocation of QoS may be provided over a period of time (e.g., when the same application is repeatedly being run). In some implementations, the receiving entity may select a QoS parameter from the set that most closely matches the bandwidth (e.g., bit rate) associated with (e.g., indicated in) the received QoS parameter.

As represented by block 208, the receiving entity uses the selected QoS parameter for subsequent communication via the bearer. For example, the receiving entity may send information in a manner (e.g., at a power level and rate) that facilitates achieving a given bit rate and error rate. In addition, the receiving entity may process different traffic flows according to the respective priorities of those traffic flows.

Figure 3:
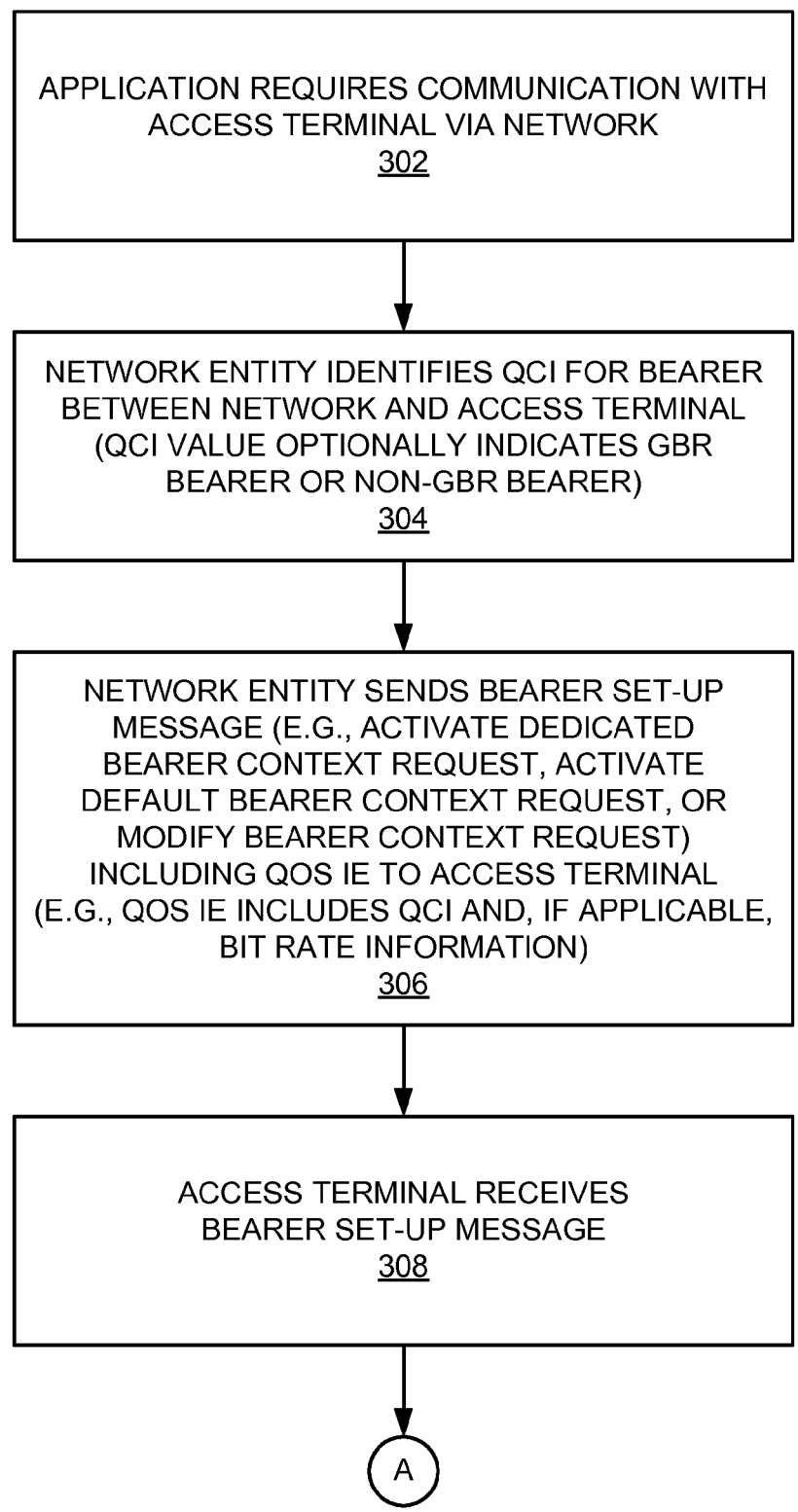
FIGS. 3 and 4 are a flowchart of several sample aspects of operations that may be performed in conjunction with an access terminal selecting a QCI from a set of known QCIs in the event an unknown QCI is received.
Figure 4:
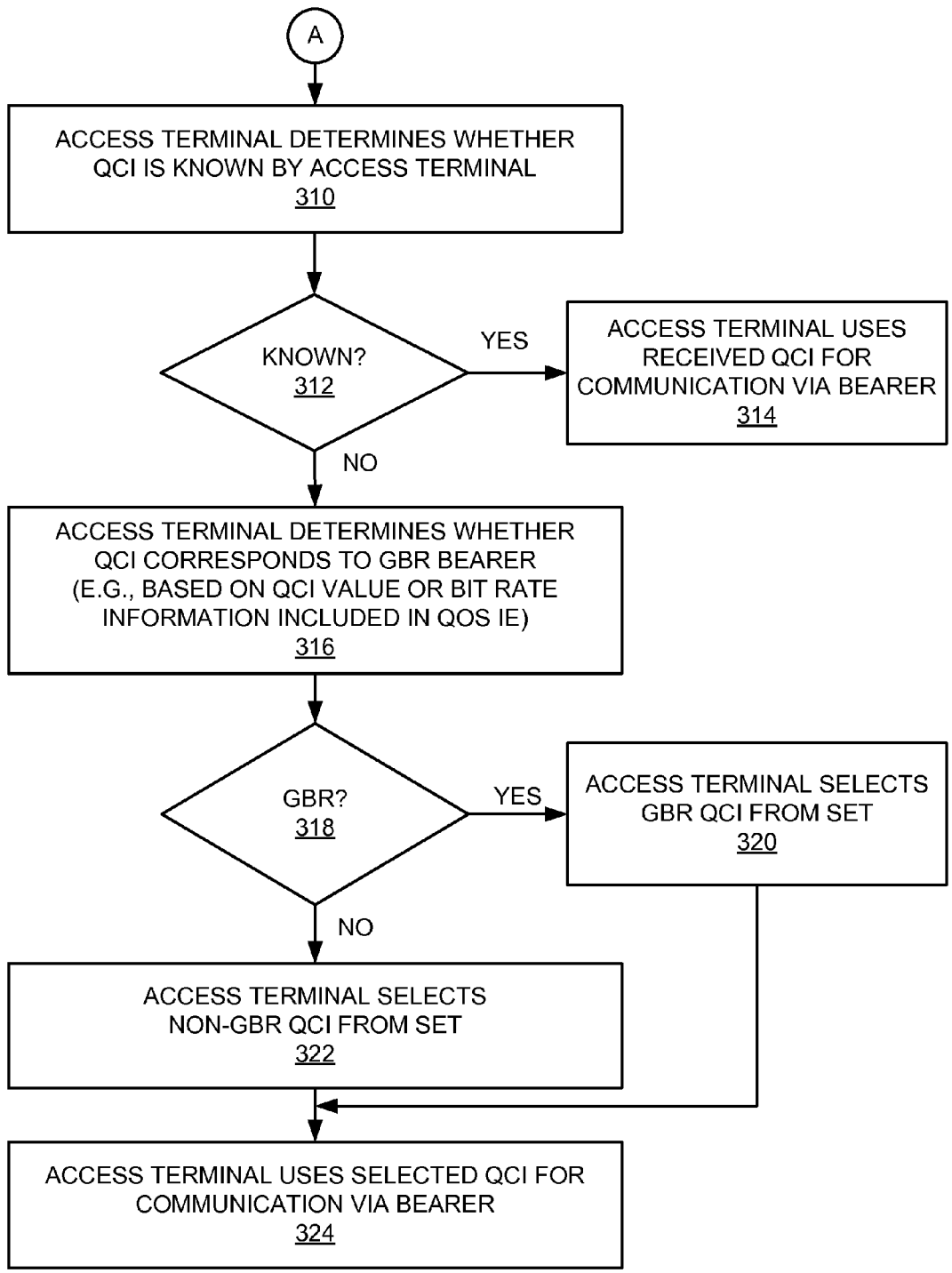
Figure 5:
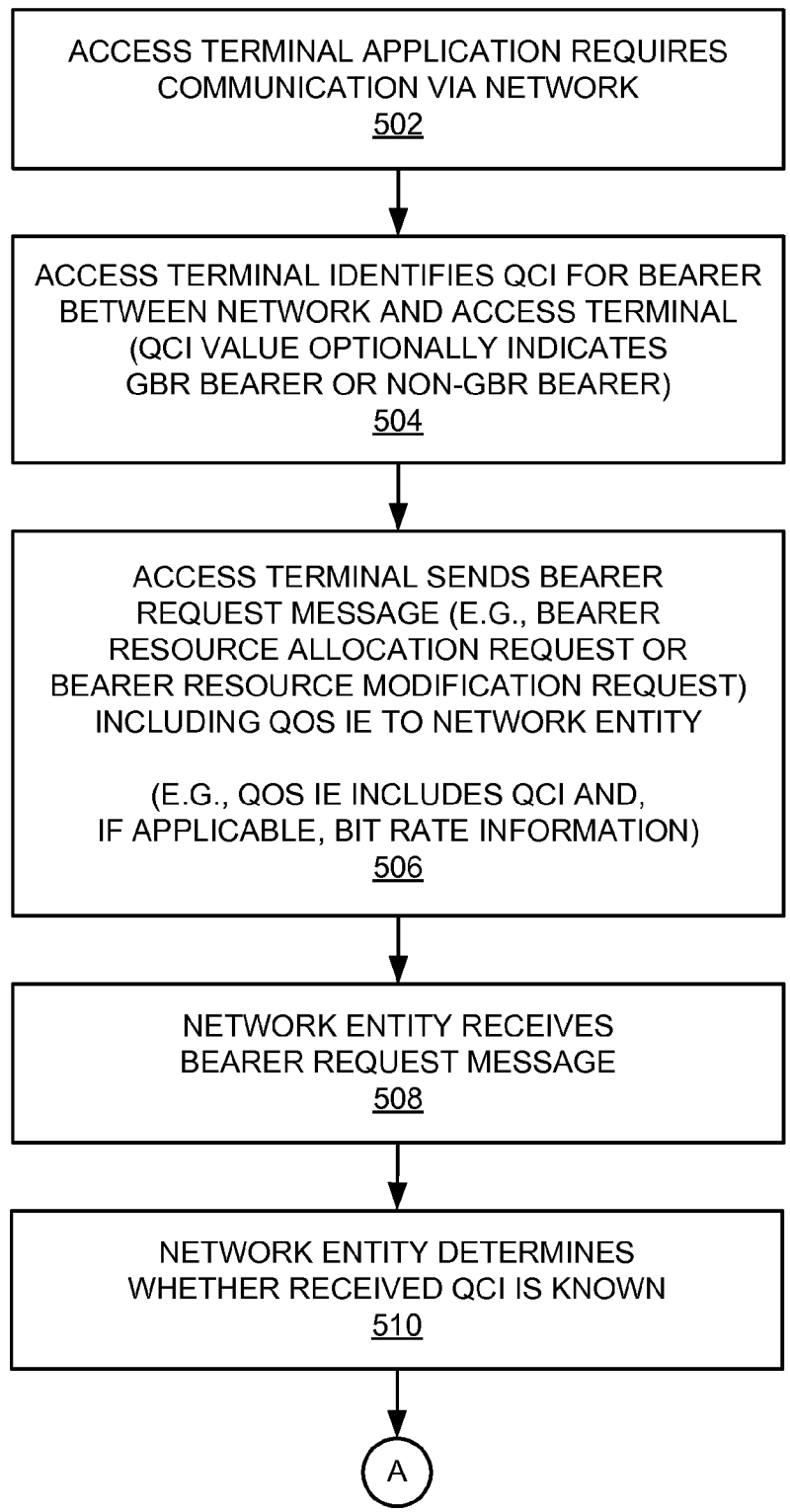
FIGS. 5 and 6 are a flowchart of several sample aspects of operations that may be performed in conjunction with a network entity selecting a QCI from a set of known QCIs in the event an unknown QCI is received.
Figure 6:
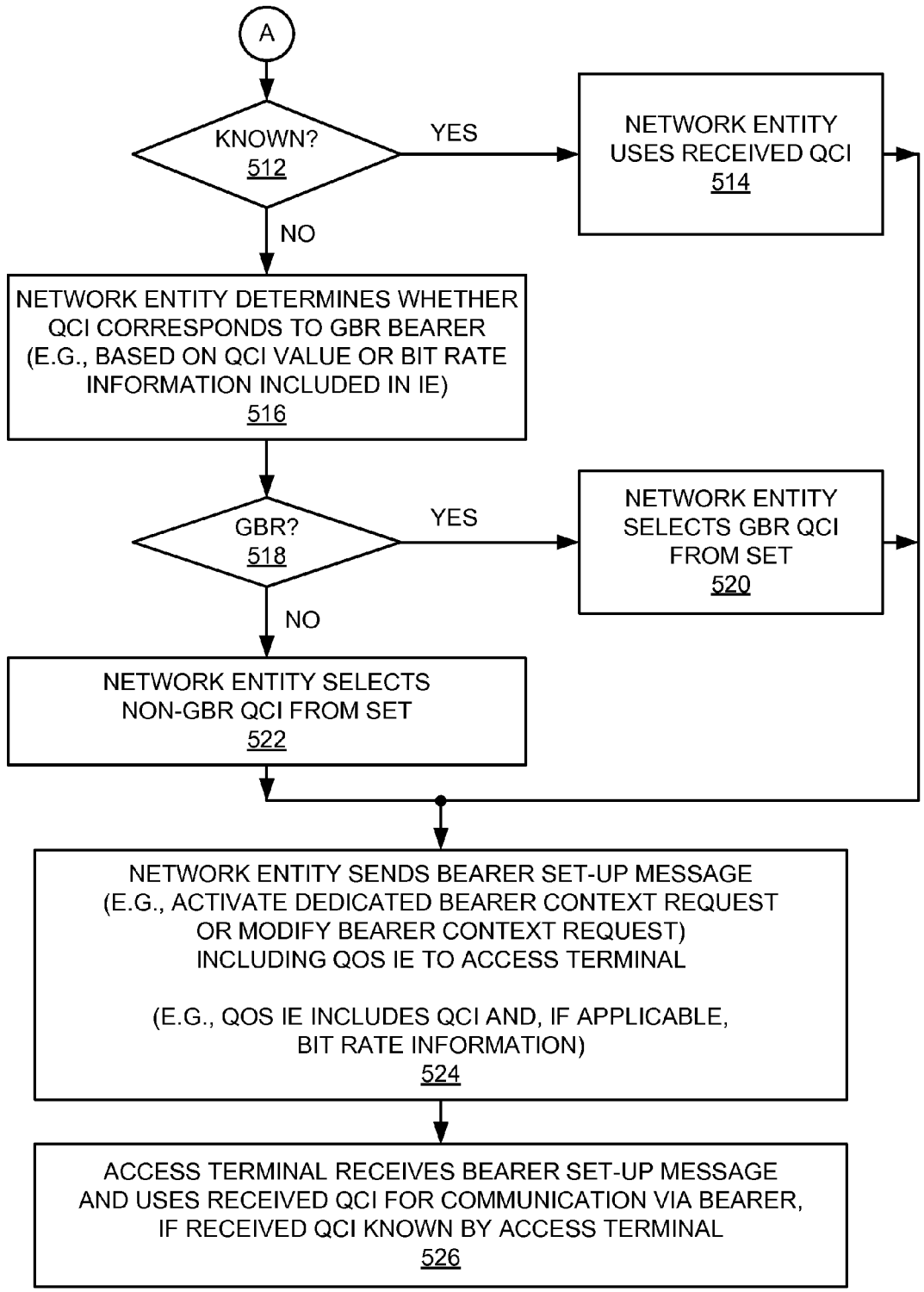
Figure 7:
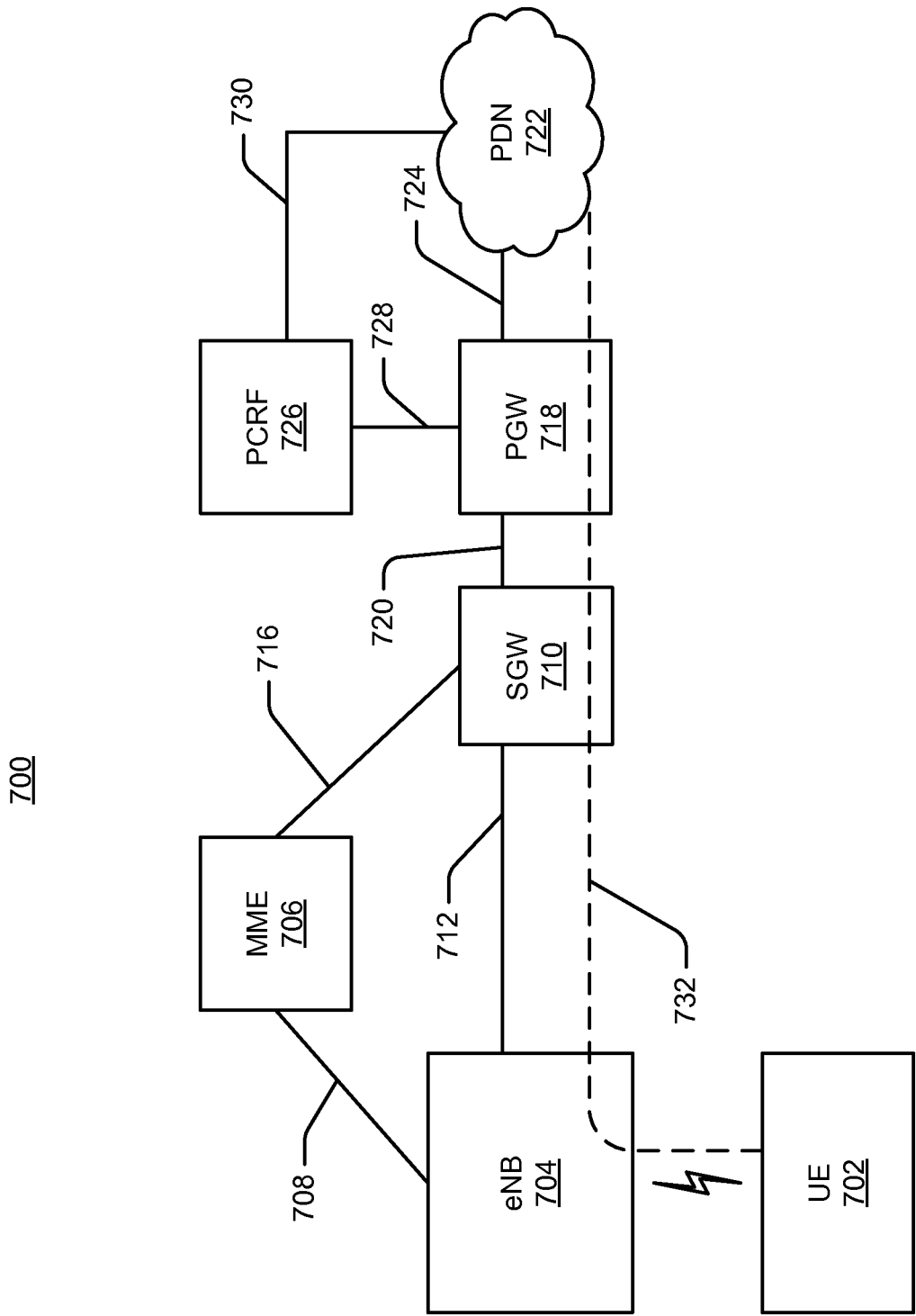
FIG. 7 is a simplified block diagram of several sample aspects of an LTE (Long Term Evolution) network.

Referring now to FIGS. 3-7, for purposes of illustration, additional details of operations that may be performed in accordance with the teachings here will be described in the context of an implementation that employs QCIs. Briefly, the flowchart of FIGS. 3 and 4 illustrates several operations that may be performed when an access terminal receives an unknown QCI from a network, and the flowchart of FIGS. 5 and 6 illustrates several operations that may be performed when a network entity receives an unknown QCI from the access terminal FIG. 7 depicts sample LTE-based entities that may perform operations such as those described in FIGS. 3-6.

As represented by block 302 of FIG. 3, at some point in time, an application or other process will need to communicate with an access terminal (e.g., the UE 702 of FIG. 7) via a network to which the access terminal is connected. For example, another access terminal may initiate a call to the access terminal or a server may initiate an information exchange with the access terminal.

As a result, the network allocates resources for the communication and commences setting up a bearer (e.g., a dedicated bearer) for the corresponding traffic flow between the access terminal and the network. For example, as represented by block 304, a network entity (e.g., the MME 706 of FIG. 7) identifies an appropriate QCI to be used for the bearer.

In some aspects, a bearer may be defined by a QCI value and, if applicable, at least one bit rate (e.g., a guaranteed bit rate and/or a maximum bit rate). Thus, the specification of a particular QCI value indicates the type of bearer to be set up. For example, a particular QCI value may correspond to specific delay and loss characteristics for a bearer.

In some implementations, the value of the QCI may indicate whether that QCI corresponds to a GBR bearer. For example, a network may allocate one set of QCI values (e.g., values 1-10) for use with GBR bearers and allocate another set of QCI values (e.g., values 11-20) for use with non-GBR bearers.

As represented by block 306, the network entity sends a bearer set-up message to the access terminal. This message may take various forms. For example, in some implementations, the message comprises an evolved packet system (EPS) session management (SM) message such as an activate dedicated bearer context request, an activate default bearer context request, or a modify bearer context request. In any of these cases, the message may include an indication of the bearer(s) being activated or modified.

The bearer set-up message also includes the QCI identified at block 304. In some implementations, the bearer set-up message includes a QoS information element (IE) that, in turn, includes the QCI. In cases where the bearer is associated with a GBR, the message (e.g., the IE) also may include bit rate information (e.g., the GBR and MBR). In cases where the bearer is not associated with a GBR, the message (e.g., the IE) may not include bit rate information or may have invalid values (e.g., 0) specified for the bit rate information. In some implementations, an IE includes an IE identifier, an IE length, a QCI value, guaranteed bits rates for the uplink and downlink (e.g., relevant for GBR bearers), and maximum bit rates for the uplink and downlink (e.g., relevant for GBR bearers).

As represented by blocks 308-312, the access terminal receives the bearer message sent by the network entity and determines whether the QCI included in the message is known. For example, the access terminal may determine whether the QCI is a member of a set of defined QCIs that are supported by the access terminal (e.g., as maintained in a list stored in a memory of the access terminal).

As represented by block 314, in the event the QCI is known by the access terminal, the access terminal uses that QCI for sending and receiving traffic via the designated bearer. In contrast, in the event the QCI is not known to the access terminal, the access terminal commences operations to select a QCI for the bearer from the set of defined QCIs. Note that in this case, the access terminal does not reject the message due to the QCI mismatch. Rather, the access terminal accepts the message and autonomously selects the QCI.

Blocks 316-322 relate to operations the access terminal performs to select either a GBR QCI or non-GBR QCI. As represented by blocks 316 and 318, the access terminal determines whether the QCI received at block 308 corresponds to a GBR bearer. For example, as discussed above, this may involve determining whether the value of the QCI corresponds to a GBR or non-GBR value, or this may involve determining whether the message received at block 308 (e.g., the IE) includes bit rate (e.g., GBR and/or MBR) information.

As represented by block 320, in the event the QCI corresponds to a GBR bearer, the access terminal selects a GBR QCI from the set of defined QCIs. As mentioned above, the selection of a particular one of these QCIs may involve selecting the highest performance QCI (e.g., the QCI with the highest QoS) from the set of GBR QCIs, selecting the lowest performance QCI (e.g., the QCI with the lowest QoS) from the set of GBR QCIs, randomly selecting one of the GBR QCIs of the set, selecting a GBR QCI that is associated with a bandwidth that most closely matches a bandwidth associated with the received QCI, or selecting a GBR QCI based on some other criteria or criterion.

As represented by block 322 on the other hand, in the event the QCI does not correspond to a GBR bearer, the access terminal selects a non-GBR QCI from the set of defined QCIs. As mentioned above, the selection of a particular one of these QCIs may involve selecting the highest performance QCI from the set of non-GBR QCIs, selecting the lowest performance QCI from the set of non-GBR QCIs, randomly selecting one of the non-GBR QCIs of the set, selecting a non-GBR QCI that is associated with a bandwidth that most closely matches a bandwidth associated with the received QCI, or selecting a non-GBR QCI based on some other criteria or criterion.

As represented by block 324, the access terminal uses the selected QCI for subsequent communication via the bearer. That is, for internal operations, the access terminal uses the selected QCI rather than the QCI that was received at block 308. In some implementations, when communicating the QCI value for that bearer to the network entity that sent the QCI, the access terminal may use the QCI that was received at block 308 (instead of the selected QCI). In this way, the network entity may be prevented from detecting a mismatch, if desired.

Referring now to FIGS. 5 and 6, as represented by block 502, at some point in time, an access terminal (e.g., the UE 702 of FIG. 7) will need to communicate via an associated network. For example, the access terminal may initiate a call to another access terminal that is reachable via the network or the access terminal may initiate an information exchange with a server that is reachable via the network.

In this case, the access terminal may initiate operations to cause the network to allocate resources for this communication. As represented by block 504, in conjunction with these operations, the access terminal may identify a QCI to be used for a corresponding bearer. As discussed above, in some implementations the value of the QCI indicates whether the QCI is associated with a GBR bearer.

As represented by block 506, the access terminal sends a bearer request message to a network entity (e.g., the MME 706 of FIG. 7). This message may take various forms. For example, in some implementations, the message may comprise an EPS SM (ESM) message such as a bearer resource allocation request or a bearer resource modification request. The bearer request message includes the QCI identified at block 504. In some implementations, the bearer request message includes a QoS information element (IE) that, in turn, includes the QCI. In cases where the bearer is associated with a GBR, the message (e.g., the IE) also may include bit rate information. In cases where the bearer is not associated with a GBR, the message (e.g., the IE) may not include bit rate information or may have invalid values (e.g., 0) specified for the bit rate information.

As represented by blocks 508-512, the network entity receives the bearer request message sent by the access terminal and determines whether the QCI included in the message is known. Thus, the network entity may determine, for example, whether the QCI is a member of a set of defined QCIs supported by the network (e.g., as maintained in a list stored in a memory of the network entity).

As represented by block 514, in the event the QCI is known by the network entity, the network entity uses that QCI for sending and receiving traffic via the designated bearer (e.g., the network entity specifies bearer context for the bearer based on the received QCI). In contrast, in the event the QCI is not known to the network entity, the network entity commences operations to select a QCI for the bearer from the set of defined QCIs.

Blocks 516-522 relate to operations the network entity performs to select either a GBR QCI or non-GBR QCI. As represented by blocks 516 and 518, the network entity determines whether the QCI received at block 508 corresponds to a GBR bearer (e.g., as discussed above at blocks 316 and 318).

As represented by block 520, in the event the QCI corresponds to a GBR bearer, the network entity selects a GBR QCI from the set of defined QCIs. This may be performed, for example, in a similar manner as described above at block 320.

As represented by block 522, in the event the QCI does not correspond to a GBR bearer, the network entity selects a non-GBR QCI from the set of defined QCIs. This may be performed, for example, in a similar manner as described above at block 322.

As represented by block 524, the network allocates resources for the communication and commences setting up the bearer for the corresponding traffic flow between the access terminal and the network. Here, the QCI from block 514, block 520, or block 522 is used to define the bearer. The network entity then sends a bearer set-up message to the access terminal (e.g., in a similar manner as discussed above at block 306). This bearer message includes the QCI received at block 508, the QCI selected at block 520, or the QCI selected at block 522. Again, the bearer message may include a QoS information element (IE) that, in turn, includes the QCI.

As represented by block 526, the access terminal receives the bearer message sent by the network entity and uses the QCI included in the message for communication via the bearer for those situations where this QCI is known by the access terminal. In situations where this QCI in not known by the access terminal, the access terminal may perform operations similar to those described in conjunction with FIGS. 3 and 4 above.

As mentioned above, the teachings herein may be implemented in an LTE-based network or some other type of network. Sample components of an LTE-based network 700 are shown in FIG. 7.

In FIG. 7, user equipment (UE) 702 communicates via wireless signals with an eNB 704 (e.g., via E-UTRA protocol). The eNB 704, in turn, communicates with a mobility management entity (MME) 706 via an S1-MME reference point as represented by a line 708. The eNB 704 also communicates with a serving gateway (SGW) 710 via an S1-U reference point as indicated by a line 712. The MME 706 communicates with the SGW 710 via an S11 reference point as indicated by a line 716. The SGW 710 communicates with a packet data network gateway (PGW) 718 via an S5 or an S8 reference point as indicated by a line 720. The PGW 718 communicates with a packet data network (PDN) 722 (e.g., the Internet and an IP multimedia subsystem (IMS)) via SGi reference point as indicated by line a 724. Also, a policy and charge rules function (PCRF) 726 communicates with the PGW 718 via Gx reference point as indicated by a line 728 and the PDN 722 via Rx reference point as indicated by a line 730.

In the example of FIG. 7, the UE 702 cooperates with the MME 706 to establish bearers for the UE 702. For example, in response to a resource request, the MME 706 will allocate the requested resources and set up an associated bearer (e.g., a dedicated bearer) between the UE 702 and the SGW 710 or the PGW 718. In this way, the UE 702 may send and receive information via one or more traffic flows as represented by a dashed line 732 through the PDN 722 (or some other suitable network connectivity). For example, once the bearer is established, the bearer context is used to facilitate communication between the UE 702 and some other node (e.g., a phone, a server, etc.) via the network 700. When the PGW 718 receives a packet from the other node (e.g., via the PDN 722), the PGW 718 may compare the packet header information with the currently active packet filters for established bearers and assign the packet to the appropriate bearer based on this comparison. In this way, the network may apply the QoS associated with the QCI selected by the MME 706 as taught herein when routing the packet to the UE 702. Conversely, when the UE 702 sends a packet to the node, the UE 702 may apply the QoS associated with the QCI selected by the UE 702 as taught herein.

Figure 8:
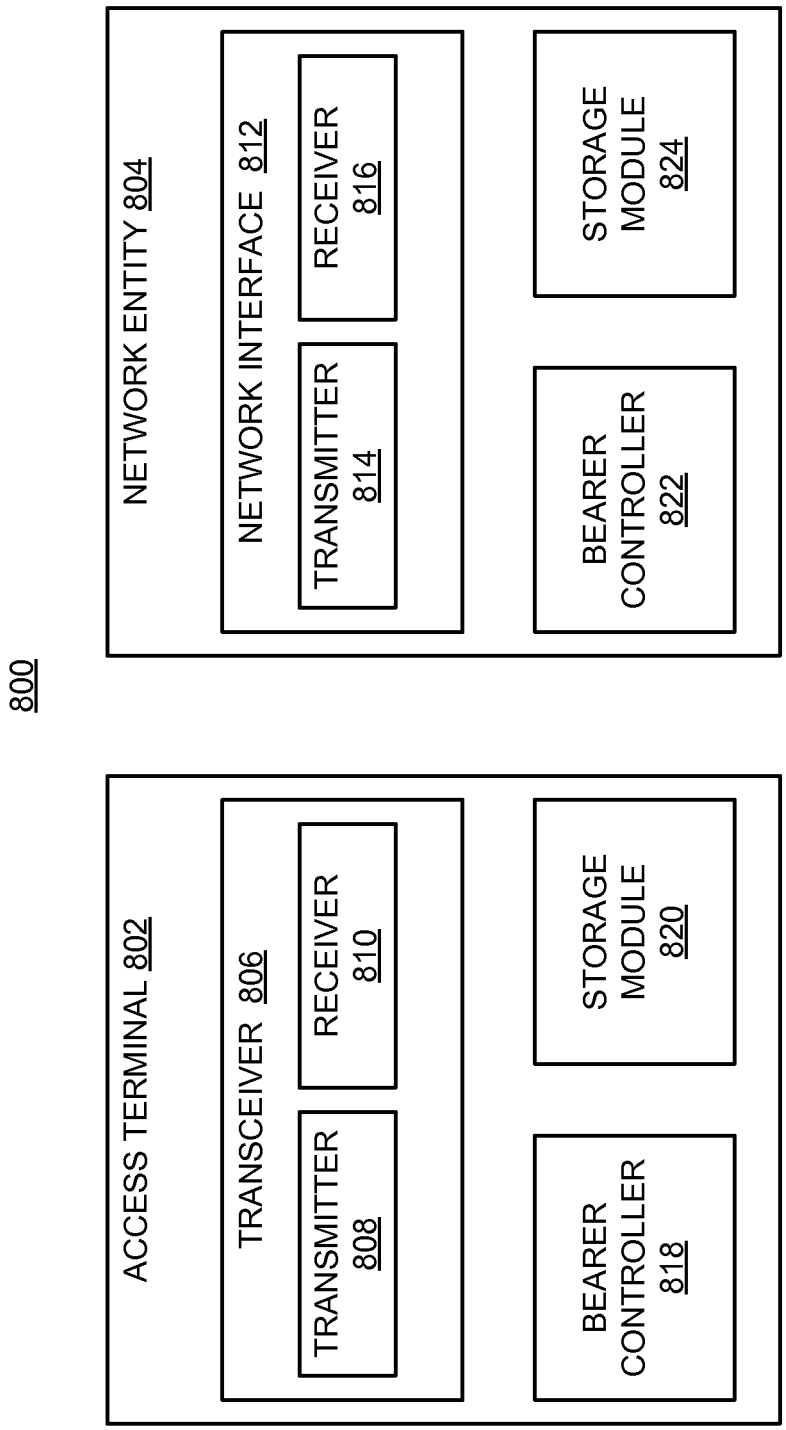
FIG. 8 is a simplified block diagram of several sample aspects of components that may be employed in communication nodes.

FIG. 8 illustrates several sample components that may be incorporated into nodes such as an access terminal 802 and a network entity 804 to perform bearer control operations as taught herein. The described components also may be incorporated into other nodes in a communication system to provide similar functionality. Also, a given node may contain one or more of the described components. For example, an access terminal may contain multiple transceiver components that enable the access terminal to operate on multiple frequencies and/or communicate via different technologies.

As shown in FIG. 8, the access terminal 802 includes a transceiver 806 for communicating with other nodes. The transceiver 806 includes a transmitter 808 for sending signals (e.g., messages, requests, IEs, QCIs, etc.) and a receiver 810 for receiving signals (e.g., messages, requests, IEs, QCIs, etc.).

The network entity includes a network interface 812 for communicating with other nodes (e.g., other network nodes). For example, the network interface 818 may include a transmitter 814 for sending signals and a receiver 816 for receiving signals via a wired or wireless connection (e.g., the backhaul).

The access terminal 802 and the network entity 804 also include other components that may be used in conjunction with bearer control operations as taught herein. For example, the access terminal 802 includes a bearer controller 818 (e.g., corresponding to the bearer control component 108 of FIG. 1) for performing bearer-related processing (e.g., determining that a received QCI is not included in a set, selecting a QCI, determining whether a received QCI corresponds to a GBR bearer) and for providing other related functionality as taught herein. The access terminal 802 also includes a storage module 820 (e.g., a memory component or memory device) for storing information (e.g., defined QoS parameters 118) and for providing other related functionality as taught herein. Similarly, the network entity 804 includes a bearer controller 822 (e.g., corresponding to the bearer control component 112) for performing bearer-related processing and for providing other related functionality as taught herein. The network entity 804 also includes a storage module 824 for storing information and for providing other related functionality as taught herein.

In some implementations, the components of FIG. 8 may be implemented in one or more processors (e.g., that uses and/or incorporates data memory for storing information or code used by the processor(s) to provide this functionality). For example, some or all of the functionality of blocks 806, 818, and 820 may be implemented by a processor or processors of an access terminal and data memory of the access terminal (e.g., by execution of appropriate code and/or by appropriate configuration of processor components). Similarly, some or all of the functionality of blocks 812, 822, and 824 may be implemented by a processor or processors of a network entity and data memory of the network entity (e.g., by execution of appropriate code and/or by appropriate configuration of processor components).

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 9:
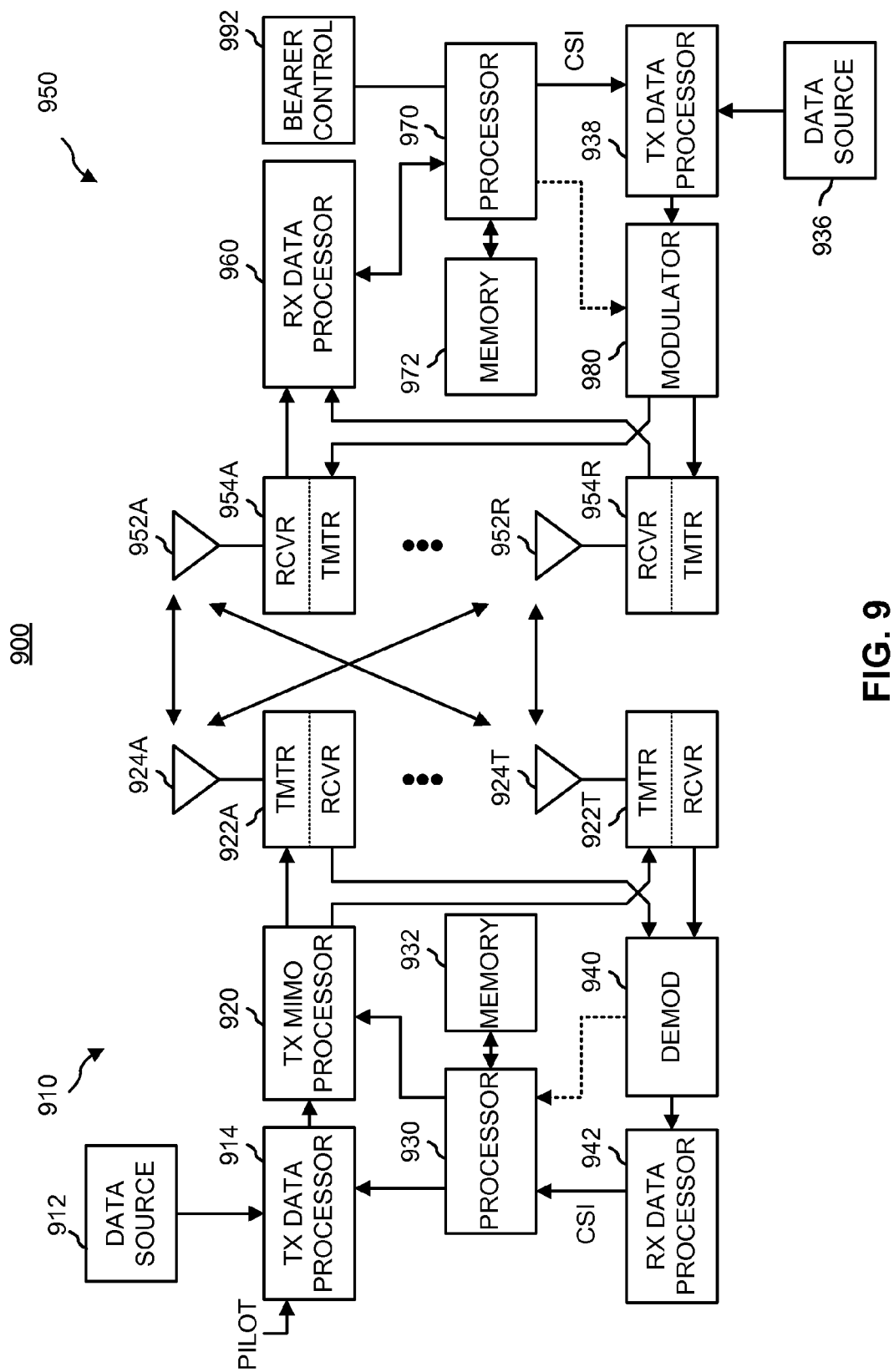
FIG. 9 is a simplified block diagram of several sample aspects of communication components.

FIG. 9 illustrates a wireless device 910 (e.g., an access point) and a wireless device 950 (e.g., an access terminal) of a sample MIMO system 900. At the device 910, traffic data for a number of data streams is provided from a data source 912 to a transmit (TX) data processor 914. Each data stream may then be transmitted over a respective transmit antenna.

The TX data processor 914 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 930. A data memory 932 may store program code, data, and other information used by the processor 930 or other components of the device 910.

The modulation symbols for all data streams are then provided to a TX MIMO processor 920, which may further process the modulation symbols (e.g., for OFDM). The TX MIMO processor 920 then provides $N_T$ modulation symbol streams to $N_T$ transceivers (XCVR) 922A through 922T. In some aspects, the TX MIMO processor 920 applies beam-forming weights to the symbols of the data streams and to the antenna from which the symbol is being transmitted.

Each transceiver 922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 922A through 922T are then transmitted from $N_T$ antennas 924A through 924T, respectively.

At the device 950, the transmitted modulated signals are received by $N_R$ antennas 952A through 952R and the received signal from each antenna 952 is provided to a respective transceiver (XCVR) 954A through 954R. Each transceiver 954 conditions (e.g., filters, amplifies, and downconverts) a respective received signal, digitizes the conditioned signal to provide samples, and further processes the samples to provide a corresponding "received" symbol stream.

A receive (RX) data processor 960 then receives and processes the $N_R$ received symbol streams from $N_R$ transceivers 954 based on a particular receiver processing technique to provide $N_T$ "detected" symbol streams. The RX data processor 960 then demodulates, deinterleaves, and decodes each detected symbol stream to recover the traffic data for the data stream. The processing by the RX data processor 960 is complementary to that performed by the TX MIMO processor 920 and the TX data processor 914 at the device 910.

A processor 970 periodically determines which pre-coding matrix to use (discussed below). The processor 970 formulates a reverse link message comprising a matrix index portion and a rank value portion. A data memory 972 may store program code, data, and other information used by the processor 970 or other components of the device 950.

The reverse link message may comprise various types of information regarding the communication link and/or the received data stream. The reverse link message is then processed by a TX data processor 938, which also receives traffic data for a number of data streams from a data source 936, modulated by a modulator 980, conditioned by the transceivers 954A through 954R, and transmitted back to the device 910.

At the device 910, the modulated signals from the device 950 are received by the antennas 924, conditioned by the transceivers 922, demodulated by a demodulator (DEMOD) 940, and processed by a RX data processor 942 to extract the reverse link message transmitted by the device 950. The processor 930 then determines which pre-coding matrix to use for determining the beam-forming weights then processes the extracted message.

FIG. 9 also illustrates that the communication components may include one or more components that perform bearer control operations as taught herein. For example, a bearer control component 992 may cooperate with the processor 970 and/or other components of the device 950 to send/receive signals to/from another device (e.g., device 910) in conjunction with establishing, modifying, and using bearers. It should be appreciated that for each device 910 and 950 the functionality of two or more of the described components may be provided by a single component. For example, a single processing component may provide the functionality of the bearer control component 992 and the processor 970.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1×RTT, 1×EV-DO Re10, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB (eNB), a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 10:
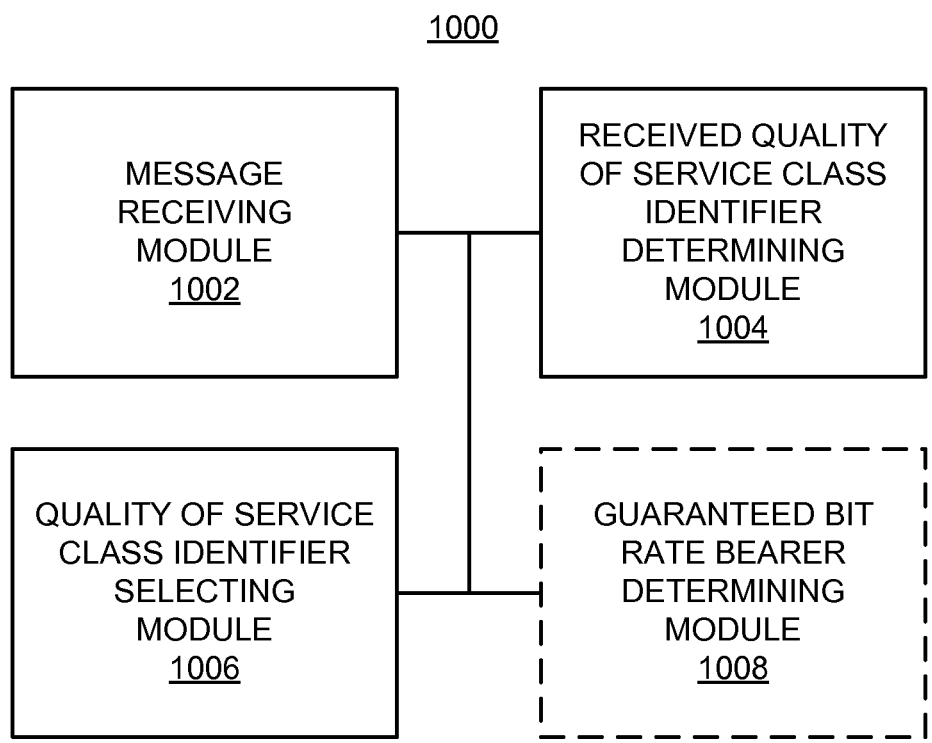
FIG. 10 is a simplified block diagram of several sample aspects of an apparatus configured to select QoS parameters as taught herein.

The functionality described herein (e.g., with regard to one or more of the accompanying figures) may correspond in some aspects to similarly designated "means for" functionality in the appended claims. Referring to FIG. 10, an apparatus 1000 is represented as a series of interrelated functional modules. Here, a message receiving module 1002 may correspond at least in some aspects to, for example, a receiver as discussed herein. A received quality of service class identifier determining module 1004 may correspond at least in some aspects to, for example, a bearer controller as discussed herein. A quality of service class identifier selecting module 1006 may correspond at least in some aspects to, for example, a bearer controller as discussed herein. A guaranteed bit rate bearer determining module 1008 may correspond at least in some aspects to, for example, a bearer controller as discussed herein.

The functionality of the modules of FIG. 10 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIG. 10 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
maintaining, by a communication entity, at least three different sets of quality of service (QoS) class identifiers (QCIs) for a bearer, including a set of defined QCIs, a set of guaranteed bit rate (GBR) QCIs, and a set of non-GBR QCIs;
receiving, by the communication entity, a message for establishing or modifying the bearer with the communication entity, the message including a QCI for said bearer, wherein a value of the QCI corresponds to specific delay and loss characteristics for said bearer;
determining whether the received QCI is included in the set of defined QCIs and, when the received QCI is included in the set of defined QCIs, selecting from the set of defined QCIs a QCI for the bearer corresponding to the received QCI;
when the received QCI is not included in the set of defined QCIs, determining whether the received QCI is associated with a guaranteed bit rate bearer;
when the received QCI is associated with the guaranteed bit rate bearer, selecting from the set of GBR QCIs one of the GBR QCI for the bearer; and
when the received QCI is not associated with the guaranteed bit rate bearer, selecting from the set of non-GBR QCIs one of the non-GBR QCI for the bearer.

2. The method of claim 1, wherein the determination of whether the received QCI is associated with a guaranteed bit rate bearer comprises determining whether the message includes bit rate information.

3. The method of claim 2, wherein the bit rate information comprises at least one guaranteed bit rate, at least one maximum bit rate, or at least one guaranteed bit rate and at least one maximum bit rate.

4. The method of claim 2, wherein:
the message further includes a QoS information element for the bearer; and
the QCI and the bit rate information are included in the QoS information element.

5. The method of claim 1, wherein selecting from the set of non-GBR QCIs one of the non-GBR QCI for the bearer includes one of:
selecting a highest QoS from the set of non-GBR QCIs;
selecting a lowest QoS from the set of non-GBR QCIs;
randomly selecting a QoS from the set of non-GBR QCIs; and
selecting a non-GBR QCI associated with a bandwidth that most closely matches a bandwidth associated with the received QCI.

6. The method of claim 1, wherein selecting from the set of GBR QCIs one of the GBR QCI for the bearer includes selecting a highest QoS from the set of GBR QCIs.

7. The method of claim 1, wherein selecting from the set of GBR QCIs one of the GBR QCI for the bearer includes selecting a lowest QoS from the set of GBR QCIs.

8. The method of claim 1, wherein selecting from the set of GBR QCIs one of the GBR QCI for the bearer includes randomly selecting a QoS from the set of GBR QCIs.

9. The method of claim 1, wherein selecting from the set of GBR QCIs one of the GBR QCI for the bearer includes selecting a GBR QCI associated with a bandwidth that most closely matches a bandwidth associated with the received QCI.

10. The method of claim 1, wherein the message comprises an evolved packet system session management message.

11. The method of claim 1, wherein:
the communication entity is an access terminal; and
the access terminal specifies quality of service parameters for sending and receiving information via the bearer based on the selected another quality of service class identifier.

12. The method of claim 11, wherein the message comprises an activate dedicated bearer context request, an activate default bearer context request, or a modify bearer context request.

13. The method of claim 11, wherein:
the communication entity is a network entity; and
the network entity sends another message including the selected QCI to the access terminal to specify QoS parameters for the bearer.

14. The method of claim 13, wherein:
the message comprises a bearer resource allocation request or a bearer resource modification request; and
the another message comprises an activate dedicated bearer context request or a modify bearer context request.

15. An apparatus for communication, comprising:
a data storage configured to store at least three different sets of quality of service (QoS) class identifiers (QCIs) for a bearer, including a set of defined QCIs, a set of guaranteed bit rate (GBR) QCIs, and a set of non-GBR QCIs;
a receiver configured to receive a message for establishing or modifying the bearer, the message including a QCI for said bearer, wherein a value of the QCI corresponds to specific delay and loss characteristics for said bearer; and
a bearer controller configured to:
determine whether the received QCI is included in the set of defined QCIs and, when the received QCI is included in the set of defined QCIs, select from the set of defined QCIs a QCI for the bearer corresponding to the received QCI;
when the received QCI is not included in the set of defined QCIs, determine whether the received QCI is associated with a guaranteed bit rate bearer;
when the received QCI is associated with the guaranteed bit rate bearer, select from the set of GBR QCIs one of the GBR QCI for the bearer; and
when the received QCI is not associated with the guaranteed bit rate bearer, select from the set of non-GBR QCIs one of the non-GBR QCI for the bearer.

16. The apparatus of claim 15, wherein the determination of whether the received QCI corresponds to a guaranteed bit rate bearer comprises determining whether the message includes bit rate information.

17. The apparatus of claim 16, wherein the bit rate information comprises at least one guaranteed bit rate, at least one maximum bit rate, or at least one guaranteed bit rate and at least one maximum bit rate.

18. The apparatus of claim 16, wherein:
the message further includes a QoS information element for the bearer; and
the QCI and the bit rate information are included in the QoS element.

19. The apparatus of claim 15, wherein selecting from the set of non-GBR QCIs one of the non-GBR QCI for the bearer includes one of:
selecting a highest QoS from the set of non-GBR QCIs;
selecting a lowest QoS from the set of non-GBR QCIs;
randomly selecting a QoS from the set of non-GBR QCIs; and
selecting a non-GBR QCI associated with a bandwidth that most closely matches a bandwidth associated with the received QCI.

20. The apparatus of claim 15, wherein:
the apparatus comprises an access terminal; and
quality of service parameters for sending and receiving information via the bearer are specified based on the selected another quality of service class identifier.

21. The apparatus of claim 15, wherein selecting from the set of GBR QCIs one of the GBR QCI for the bearer includes one of:
selecting a highest QoS from the set of GBR QCIs;
selecting a lowest QoS from the set of GBR QCIs;
randomly selecting a QoS from the set of GBR QCIs; and
selecting a GBR QCI associated with a bandwidth that most closely matches a bandwidth associated with the received QCI.

22. A computer-program product, comprising:
a non-transitory computer-readable medium comprising code for causing a computer to:
maintain at least three different sets of quality of service (QoS) class identifiers (QCIs) for a bearer, including a set of defined QCIs, a set of guaranteed bit rate (GBR) QCIs, and a set of non-GBR QCIs;
receive a message for establishing or modifying the bearer, the message including a QCI for said bearer, wherein a value of the QCI corresponds to specific delay and loss characteristics for said bearer;
determine whether the received QCI is included in the set of defined QCIs and, when the received QCI is included in the set of defined QCIs, select from the set of defined QCIs a QCI for the bearer corresponding to the received QCI;

when the received QCI is not included in the set of defined QCIs, determine whether the received QCI is associated with a guaranteed bit rate bearer;

when the received QCI is associated with the guaranteed bit rate bearer, select from the set of GBR QCIs one of the GBR QCI for the bearer; and when the received QCI is not associated with the guaranteed bit rate bearer, select from the set of non-GBR QCIs one of the non-GBR QCI for the bearer.

23. The computer-program product of claim 22, wherein the determination of whether the received QCI corresponds to a guaranteed bit rate bearer comprises determining whether the message includes bit rate information.

24. The computer-program product of claim 23, wherein the bit rate information comprises at least one guaranteed bit rate, at least one maximum bit rate, or at least one guaranteed bit rate and at least one maximum bit rate.

25. The computer-program product of claim 23, wherein:
the message further includes a QoS information element for the bearer; and
the QCI and the bit rate information are included in the QoS information element.

26. The computer-program product of claim 22, wherein selecting from the set of non-GBR QCIs one of the non-GBR QCI for the bearer includes one of:

selecting a highest QoS from the set of non-GBR QCIs;
selecting a lowest QoS from the set of non-GBR QCIs;
randomly selecting a QoS from the set of non-GBR QCIs; and
selecting a non-GBR QCI associated with a bandwidth that most closely matches a bandwidth associated with the received QCI.

27. The computer-program product of claim 22, wherein:
the message is received by an access terminal; and
the access terminal specifies QoS parameters for sending and receiving information via the bearer based on the selected another QCI.

28. The computer-program product of claim 22, wherein selecting from the set of GBR QCIs one of the GBR QCI for the bearer includes one of:

selecting a highest QoS from the set of GBR QCIs;
selecting a lowest QoS from the set of GBR QCIs;
randomly selecting a QoS from the set of GBR QCIs; and
selecting a GBR QCI associated with a bandwidth that most closely matches a bandwidth associated with the received QCI.

* * * * *